United States Patent
Dobbelaere et al.

(10) Patent No.: US 9,249,477 B2
(45) Date of Patent: Feb. 2, 2016

(54) RECOVERY OF PRECIOUS METALS FROM SPENT HOMOGENEOUS CATALYSTS

(75) Inventors: Wim Dobbelaere, Watervliet (BE); Dirk Crauwels, Boechout (BE)

(73) Assignee: Umicore, Brussels (BE)

( * ) Notice: Subject to any disclaimer, the term of this patent is extended or adjusted under 35 U.S.C. 154(b) by 40 days.

(21) Appl. No.: 13/319,737

(22) PCT Filed: May 10, 2010

(86) PCT No.: PCT/EP2010/002852
§ 371 (c)(1),
(2), (4) Date: Feb. 6, 2012

(87) PCT Pub. No.: WO2010/130388
PCT Pub. Date: Nov. 18, 2010

(65) Prior Publication Data
US 2012/0118108 A1 May 17, 2012

Related U.S. Application Data

(60) Provisional application No. 61/213,258, filed on May 21, 2009.

(30) Foreign Application Priority Data

May 14, 2009 (EP) .................................. 09006502

(51) Int. Cl.
C22B 11/00 (2006.01)
C22B 11/02 (2006.01)

(52) U.S. Cl.
CPC .............. C22B 11/026 (2013.01); *Y02W 30/54* (2015.05)

(58) Field of Classification Search
CPC .................................................... C22B 11/026
USPC ........................................................ 75/631
See application file for complete search history.

(56) References Cited

U.S. PATENT DOCUMENTS

| | | | |
|---|---|---|---|
| 3,809,524 A * | 5/1974 | Bruhlet et al. ................ | 431/181 |
| 3,920,449 A | 11/1975 | Onoda et al. | |
| 4,687,514 A | 8/1987 | Renner et al. | |
| 5,364,445 A | 11/1994 | Sakamoto et al. | |
| 5,858,059 A * | 1/1999 | Abramovich et al. .......... | 75/557 |
| 6,117,207 A * | 9/2000 | Miserlis .......................... | 75/414 |
| 6,159,268 A * | 12/2000 | Lotens et al. ................... | 75/414 |
| 7,815,706 B2 * | 10/2010 | Yamada et al. .............. | 75/10.62 |
| 2004/0026329 A1 * | 2/2004 | Ekman et al. ................ | 210/723 |

FOREIGN PATENT DOCUMENTS

| | | | |
|---|---|---|---|
| EP | 0147824 | | 7/1982 |
| EP | 1553193 | | 7/2005 |
| JP | 2008031547 A | * | 2/2008 |

OTHER PUBLICATIONS

Kametani et al. Machine Translation of JP 2008031547 A, Feb. 2008.*
Hageluken et al., Recycling of Spent Catalyst containing precious metal, Handbook of Heterogeneous Catalysis, 2008, 7:1846-1863.*
International Search Report, issued in PCT/EP2010/002852, dated Aug. 13, 2010.
International Preliminary Report on Patentability, issued in PCT/EP2010/002852, dated Nov. 24, 2011.

* cited by examiner

*Primary Examiner* — Jie Yang
*Assistant Examiner* — Xiaowei Su
(74) *Attorney, Agent, or Firm* — Brinks Gilson & Lione

(57) ABSTRACT

This disclosure concerns the recovery of PGM (platinum group metals) from spent homogeneous catalysts present in an organic phase. Specifically, a pyrometallurgical process is provided whereby the PGM, and Rh in particular, are concentrated in a metallurgical phases, rendering them accessible for refining according to known processes. To this end, a process is disclosed comprising the steps of: —providing a molten bath furnace, having a submerged injector equipped for liquid fuel firing; —providing a molten bath comprising a metallic and/or matte phase, and a slag phase; —feeding the spent homogeneous catalyst and an $O_2$ bearing gas through the injector, a major part of the PGM being recovered in the metallic and/or matte phase; —separating the PGM-bearing metallic and/or matte phase from the slag phase. The energy content of the organic waste can be effectively used for heating and/or reduction of the metallurgical charge in the furnace. Valuable metals are recovered with high yield, and the environmentally harmful organic waste is destructed.

8 Claims, No Drawings

RECOVERY OF PRECIOUS METALS FROM SPENT HOMOGENEOUS CATALYSTS

This application is a National Stage application of International Application No. PCT/EP2010/002852, filed May 10, 2010, which claims the benefit of U.S. Provisional Application No. 61/213,258, filed May 21, 2009, the entire contents of which are hereby incorporated herein by reference. This application also claims priority under 35 U.S.C. §119 to European Patent Application No. 09006502.0, filed May 14, 2009, the entire contents of which is hereby incorporated herein by reference.

This disclosure concerns the recovery of PGM (platinum group metals) from spent homogeneous catalysts present in an organic phase.

Specifically, a pyrometallurgical process is provided whereby the PGM, and Rh in particular, are concentrated in a metallurgical phases, rendering them accessible for refining according to known processes.

Several methods have been developed wherein soluble organometallic compounds, often containing PGM, and Rh in particular, are used as catalysts in a homogenous catalytic reaction. These compounds are useful for various reactions such as hydrogenation, hydroformylation, and hydrocarboxylation of olefins.

Since aforesaid compounds are chemically very stable, the catalyst solution can be recycled in the reaction system after separating it from the reaction products by distillation. However, since various high boiling by-products are formed in the aforesaid reaction, and also since the catalyst used in the reaction is partially inactivated, a portion of the catalyst-containing residue obtained at the recovery of the reaction products by distillation must be discarded. This is needed to prevent the accumulation of high boiling by-products and of inactivated catalyst.

The catalyst-containing residue, also referred to as spent catalyst, contains expensive PGM that are to be recovered from an ecologic as well as from an economic point of view.

Several methods have been proposed for the recovery of PGM from such spent catalysts. Generally, the methods are categorized as either wet or dry, according to the type of processing put to use.

In wet methods, such as known from EP-A-0147824, rhodium is removed and recovered by extracting it from the crude spent product by means of phosphine sulphonates or carboxylates as complexing reagents. Other methods, including precipitation of precious metals as sulfides, reduction by addition of a reducing agent such as Te according to U.S. Pat. No. 4,687,514, or absorption on active carbon, have been described.

Wet methods, although allowing for the recuperation of the PGM, do not solve the problem of discarding or otherwise using the organic waste products in an ecological way. Moreover, the yield of the process critically depends on breaking down the initial PGM complexes, which can be very stable.

In dry methods, such as known from U.S. Pat. No. 3,920,449, metals are recovered from a organic solvent solution containing a soluble complex of the noble metal and an organophosphorus compound by burning the organic solvent solution in a combustion zone. The combustion products are immediately introduced into an aqueous absorbing solution to catch the particles of the noble metal and phosphorus oxide formed in the combustion. U.S. Pat. No. 5,364,445 provides a similar method for recovering rhodium comprising the steps of: adding a basic compound to the organic solution containing a rhodium complex, and at least one type of organophosphorus compound as a ligand and an organophosphorus compound; combusting the resultant mixture to ash under a controlled temperature of less than 1000° C.; and cleaning the ash using a solution containing a reducing agent.

A disadvantage of the conventional dry processes lies in the burning of the organic fractions. Heat recuperation and off gas filtration are not straightforward. There is moreover a significant risk of loosing PGM in the in the soot or in the ashes.

The objective of the invention is therefore to guarantee a high yield for the recovery of the valuable metals, while destructing environmentally harmful organic waste products. The PGM, and Rh in particular should be obtained in an easily recoverable and purifyable phases. The organics should be valued for their embodied energy.

To this end, a process for recovering PGM from a spent homogeneous catalyst is disclosed, comprising the steps of:
  providing a molten bath furnace, having a submerged injector equipped for liquid fuel firing;
  providing a molten bath comprising a metallic and/or matte phase, and a slag phase;
  feeding the spent homogeneous catalyst and an $O_2$ bearing gas through the injector, a major part (i.e. more than 50% by weight) of the PGM being recovered in the metallic and/or matte phase;
  separating the PGM-bearing metallic and/or matte phase from the slag phase.

Typically, more than 90% of the PGM is recovered in the metallic and/or matte phase;

The spent homogeneous catalyst contains preferably more than 10 ppm of PGM, preferably Rh. This minimum amount is needed to insure the economy of the process.

It is advantageous to collect the PGM in a metal-bearing molten phase, such as a metallic and/or matte phase comprising a total metal content of at least 50% by weight of any one or more of Cu, Ni, Co, Fe, and Pb. This phase comprises preferably at least 50% of Cu. PGM are efficiently collected in these metals and they can be further refined using known techniques.

When a sufficient amount of spent catalyst is available, it is advantageous to completely replace the liquid fuel. This tends to maximize the PGM concentration in the metallic and/or matte phase by avoiding dilution across batches.

Advantageously, during the step of feeding the spent homogeneous catalyst and an $O_2$ bearing gas through the injector, a complex metallurgical charge is introduced into the furnace and smelted, thereby producing a metallic and/or matte phase, slag and flue dust. In this way, the energy content of the waste organic material in the catalyst is effectively utilized for heating and/or reduction of the metallurgical charge in the furnace. The flue dust can be recycled as part of the complex charge to the smelting operation. The said complex metallurgical charge typically comprises Pb, Cu, and Fe as oxides and/or as sulfides.

Pyrometallurgical processes for collecting PGM in a metallic phase are widely applied for recycling substrate-bound catalysts. The catalysts are hereby directly fed to a molten bath furnace, possibly after a simple pre-treatment such as moistening, to avoid the entrainment of fine particles with the off gas.

Spent homogeneous catalysts, however, comprise volatile organic compounds and therefore cannot be fed to a furnace in the usual way, neither as such, nor after e.g. impregnation on a solid carrier. Indeed, such a procedure would invariably lead to the evaporation and loss of significant quantities of organics, including PGM complexes.

According to the present disclosure, it has however been shown that losses through evaporation can be greatly reduced or even avoided by injecting the spent homogeneous catalyst directly into the molten bath through a fuel injector, being either a submerged lance or a tuyere.

By a submerged lance is meant a pipe designed to introduce compressed gas, typically oxygen-enriched air, into a metallurgical bath, according to a generally downward direction. A lance is often mounted vertically above the bath, with its tip dipping below the bath level in the furnace.

By a tuyere is meant a pipe designed to introduce compressed gas, typically oxygen-enriched air, into a bath, according to a generally horizontal or upward direction. A tuyere is by nature submerged, as it is positioned below the bath level, through a hole piercing the bottom or the wall of the furnace.

Lances and tuyeres can be equipped with a fuel injector. This injector can e.g. be located in a coaxial position, at or near the tip of the pipe. The fuel burns with the oxygen within the bath, thereby contributing to the heat input to the operation. In the present disclosure, only lances and tuyeres equipped for burning liquid fuel are considered.

By PGM are meant Ru, Os, Rh, Ir, Pd, and Pt.

Spent homogeneous catalyst can be very sticky, having a viscosity of more than 400 mPa·s. Such products should be preconditioned to avoid clogging in pumps and pipes. This may involve preheating and/or diluting them with an organic solvent.

When dealing with a Cu-based alloy, grinding and leaching the copper is performed to collect the PGM in a residue. The further processing of the PGM residue can be performed by classical method, e.g. by cupellation and electrowinning.

EXAMPLES

The process is performed in a cylindrical steel furnace, lined with MgO—$Cr_2O_3$ bricks, having an internal diameter of 0.7 m. The furnace is further provided with tap holes for slag and metal, and in the top section with openings for exhaust gasses and for insertion of an injection lance.

The lance comprises a RVS steel outer tube for air/oxygen injection with a diameter of 48 mm, and an inner coaxial tube with a diameter of 17 mm for fuel injection. The inner tube is equipped with a spraying nozzle at its tip.

The metallurgical charge is added over the course of 5 hours. This consists of:

500 kg lead rich slag as a starting bath; and 4000 kg (wet weight) Pb/Cu/Precious metals complex charge.

The lance parameters are:

Total gas flow rate 265 $Nm^3/h$;

Air flow rate 224 $Nm^3/h$;

$O_2$ flow rate 41 $Nm^3/h$;

Oxygen enrichment 33.1%;

Fuel (Comparative Example 1) or Rh spent (Example 2) flow rate 22 kg/h; and

Flame stoechiometry ($\lambda$) 2.18.

The process is run at a bath temperature of 1200° C. The flame stoechiometry is can be adapted so as to ensure sufficiently strong reducing conditions as indicated by a Cu concentration in the slag of less than 5%.

The off gasses and flue dust are cooled from 1200° C. to about 120° C., first in a radiation chamber, and then in an adiabatic cooler. The flue dust is collected in a baghouse. The $SO_2$ in the off gasses is neutralized in a NaOH scrubber.

Comparative Example 1

In a comparative example (reference), only conventional fuel is injected. The metallurgical charge comprises a limited amount of Rh, which is a typical background for the materials recycled in this type of operation. The feed, production, and the Rh distribution across the phases, are shown in Table 1. The charge contains 17.8% of humidity, which means that a wet weight of 4000 kg is actually fed to the furnace. Both the slag and the charge further contain uncritical amounts of metals (a total of 2 to 5% of Ni, Zn, and Sn, as oxides), metalloids (a total of 4 to 8% of As, Sb, and Te, as oxides), and other oxides (a total of 4 to 8% of $Al_2O_3$ and MgO). The S in the charge is a mixture of sulfides and sulfates.

TABLE 1

Comparative example with typical Rh background in the charge, and injection of conventional fuel

| | Weight. dry (kg) | Pb (%) | Cu (%) | Fe (%) | CaO (%) | $SiO_2$ (%) | S (%) | C (%) | Rh (ppm) | Rh (g) |
|---|---|---|---|---|---|---|---|---|---|---|
| Feed | | | | | | | | | | |
| Slag | 500 | 31.0 | 4.0 | 8.0 | 7.0 | 18.0 | 0.4 | | 2.0 | 1.0 |
| Charge | 3288 | 19.9 | 12.0 | 5.3 | 3.3 | 8.4 | 10.7 | 2.0 | 21.9 | 72.0 |
| Fuel | 110 | | | | | | | | | |
| Production | | | | | | | | | | |
| Matte/alloy | 460 | 15.7 | 62.0 | 1.4 | | | 15.0 | | 151.9 | 69.9 |
| Slag | 1992 | 28.0 | 5.2 | 10.4 | 7.2 | 18.4 | 0.4 | | 1.2 | 2.4 |
| Flue dust | 371 | 48.5 | 7.1 | | | | 10.2 | | 2.0 | 0.74 |
| Distribution | | | | | | | | | Rh (%) | |
| Matte/alloy | | | | | | | | | 95.7 | |
| Slag | | | | | | | | | 3.3 | |
| Flue dust | | | | | | | | | 1.0 | |

The Rh collects with a yield of more than 95% in the matte/alloy phase. The precious metals can be further separated and refined, according to conventional means.

Example 2

In this example according to the invention, a metallurgical charge with the same composition is processed, but with injection of Rh bearing spent catalyst instead of fuel. This particular spent catalyst is a homogeneous catalyst in an organic phase, has a Rh content of 743 ppm, a heat value of 38 MJ/kg, and a flash point higher than 70° C. The feed, production, and the Rh distribution across the phases, are shown in Table 2.

TABLE 2

Example according to invention with Rh background, and injection of Rh spent catalysis

|  | Weight. dry (kg) | Pb (%) | Cu (%) | Fe (%) | CaO (%) | SiO$_2$ (%) | S (%) | C (%) | Rh (ppm) | Rh (g) |
|---|---|---|---|---|---|---|---|---|---|---|
| Feed |  |  |  |  |  |  |  |  |  |  |
| Slag | 500 | 31.0 | 4.0 | 8.0 | 7.0 | 18.0 | 0.4 |  | 2.0 | 1.0 |
| Charge | 3288 | 19.9 | 12.0 | 5.3 | 3.3 | 8.4 | 10.7 | 2.0 | 21.9 | 72.0 |
| Rh catalyst Production | 110 |  |  |  |  |  |  |  | 743.0 | 81.7 |
| Matte/alloy | 460 | 15.7 | 62.0 | 1.4 |  |  | 15.0 |  | 315.7 | 145.2 |
| Slag | 1992 | 28.0 | 5.2 | 10.4 | 7.2 | 18.4 | 0.4 |  | 3.1 | 6.2 |
| Flue dust | 371 | 48.5 | 7.1 |  |  |  | 10.2 |  | 8.0 | 3.0 |

| Distribution | Rh (%) |
|---|---|
| Matte/alloy | 93.9 |
| Slag | 4.0 |
| Flue dust | 1.9 |

A global Rh yield in the matte/alloy phase of nearly 94% is observed.

From a comparison between Examples 1 and 2, it can be calculated that more than 92% of the Rh added through the catalyst is recovered in the matte and/or alloy. In this context, a yield of more than 90% is considered as satisfactory.

The minor amounts of Rh in the flue dust can be recovered by recycling all or part of the flue dust to the furnace. Such recycles are performed as a matter of routine when operating this type of furnace. The additional residence time of part of the Rh in this recycling loop does not significantly affect the economy of the process.

The invention claimed is:

1. A process for recovering platinum group metals (PGM) from a liquid spent homogeneous catalyst in an organic phase, comprising:
   providing a molten bath furnace, having a submerged injector comprising a spraying nozzle at its tip thereby being equipped for liquid fuel firing;
   providing a molten bath in the molten bath furnace, the molten bath comprising a metallic and/or matte phase and a slag phase;
   feeding the liquid spent homogeneous catalyst and an O$_2$ bearing gas through the submerged injector, whereby the liquid spent homogeneous catalyst and the O$_2$ burn within the molten bath, and whereby a portion of the PGM is recovered in the metallic and/or matte phase; and
   separating the PGM-bearing metallic and/or matte phase from the slag phase.

2. The process of claim 1, wherein the liquid spent homogeneous catalyst contains more than 10 ppm of PGM.

3. The process of claim 2, wherein the PGM is Rh.

4. The process of claim 1, wherein the molten metallic and/or matte phase comprises a total of at least 50% by weight of one or more of a metal selected from the group of Cu, Ni, Co, Fe and Pb.

5. The process of claim 4, wherein the molten metallic and/or matte phase comprises at least 50% by weight of Cu.

6. The process of claim 1, wherein the liquid spent homogeneous catalyst completely replaces the liquid fuel.

7. The process of claim 1, wherein, during the step of feeding the liquid spent homogeneous catalyst and the O$_2$ bearing gas through the injector, a complex metallurgical charge is introduced into the furnace and smelted, thereby producing a metallic and/or matte phase, slag and flue dust.

8. The process of claim 7, wherein at least a major part of the flue dust is recycled as part of said complex charge to said furnace.

* * * * *